Dec. 12, 1939.　　　M. E. L. J. HUSSON　　　2,183,193
CHANGE SPEED GEAR
Filed Jan. 14, 1939　　　3 Sheets-Sheet 1

Inventor
M.E.L.J. Husson
by Wilkinson & Mawhinney
Attorneys.

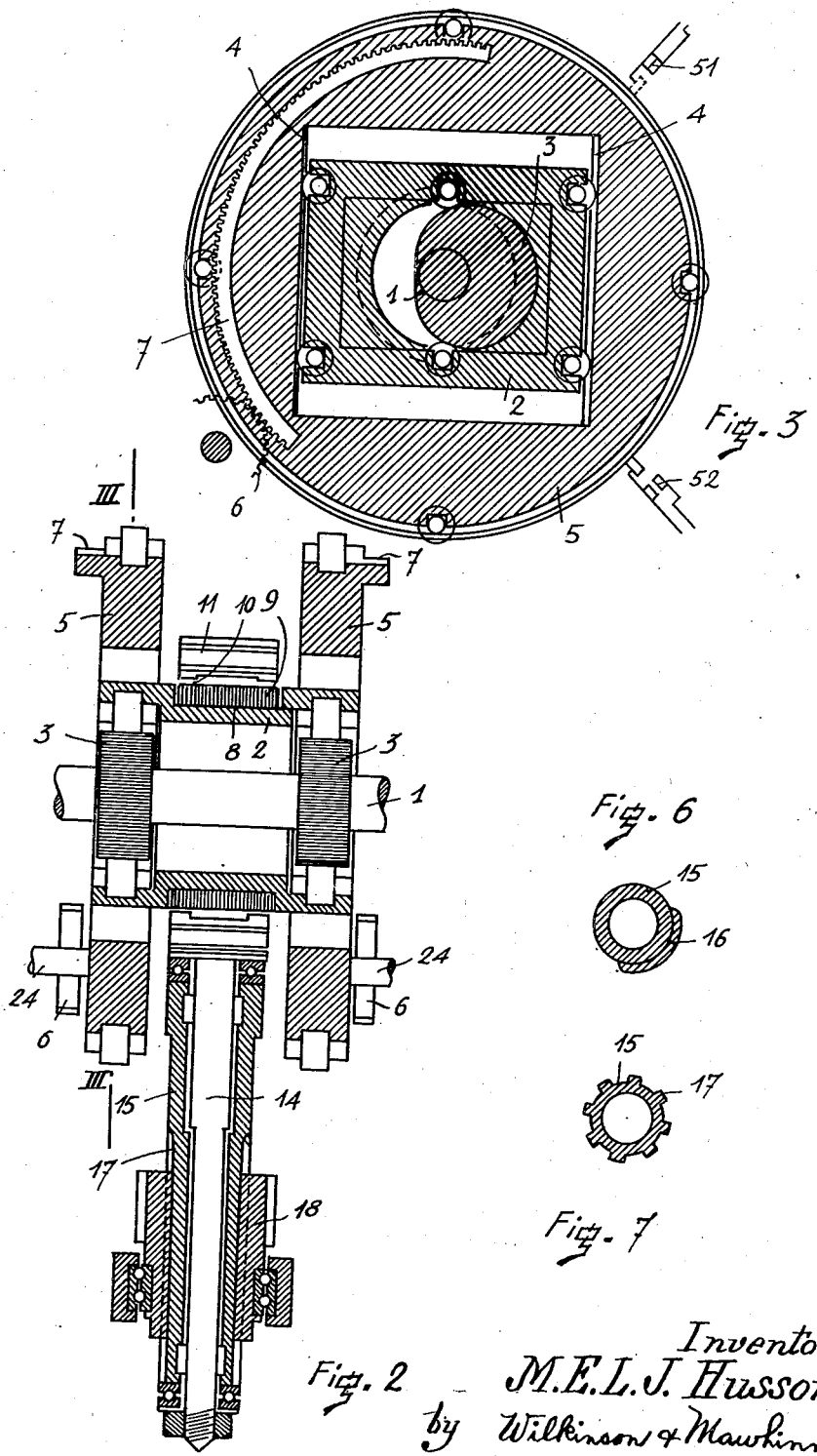

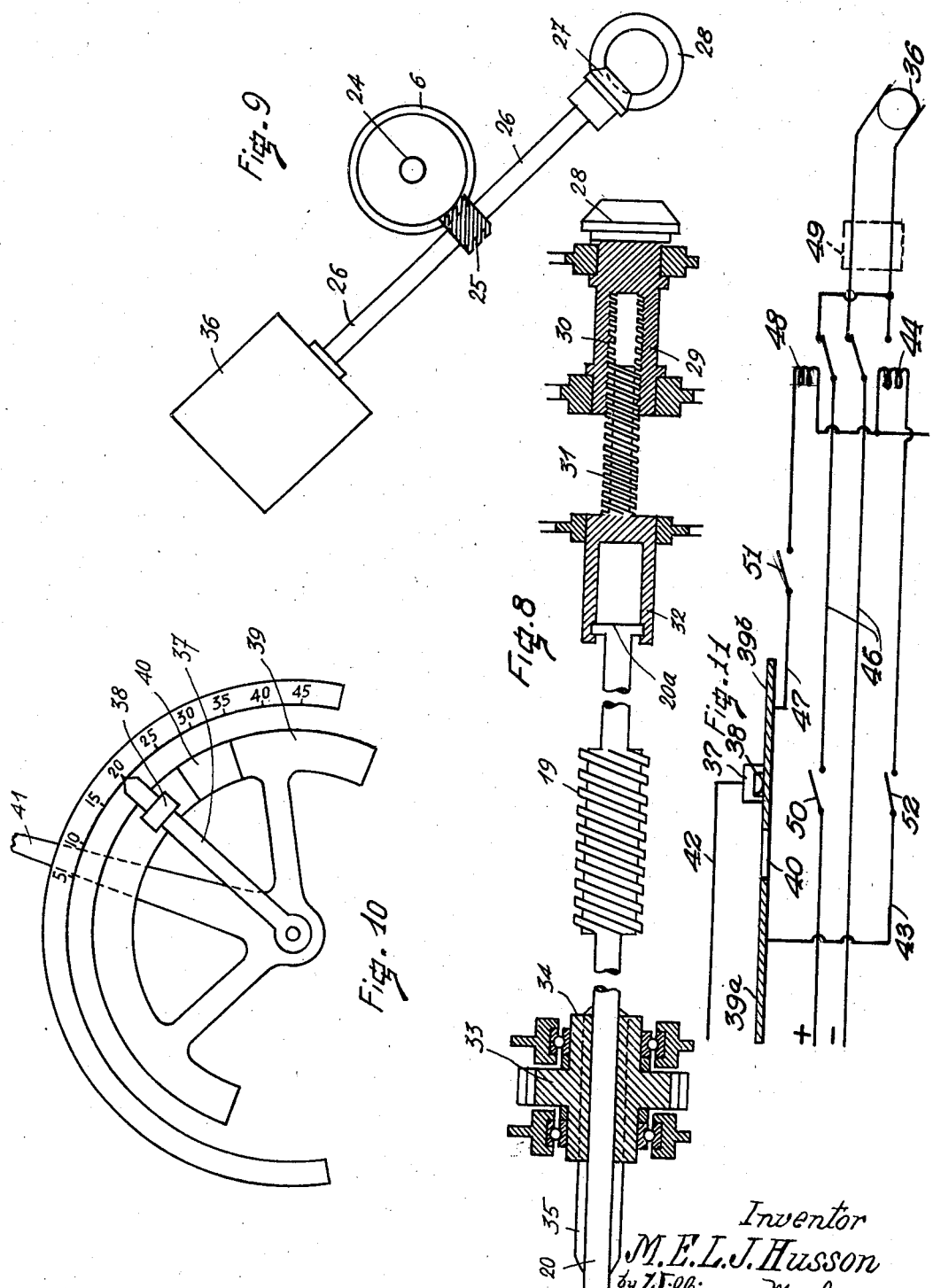

Patented Dec. 12, 1939

2,183,193

UNITED STATES PATENT OFFICE 2,183,193

CHANGE SPEED GEAR

Marie Emile Louis Jules Husson, Asnieres, Seine, France

Application January 14, 1939, Serial No. 251,016
In France December 21, 1938

6 Claims. (Cl. 74—124)

The present invention has for its object a change speed and reversing gear device which is applicable to any engine, chiefly to the engines of automobile vehicles.

Most of the change speed gears in use at the present time only offer a very restricted number of combinations, three or four at the most for forward running; consequently the engines cannot be used continually at their most efficient speed, thereby involving inefficient operation and an excessive consumption of fuel.

Certain devices which give a more extended scale of gear ratios and are based on friction or hydraulic systems, have scarcely got beyond the experimental stage or, in any case, have been abandoned owing to the considerable portion of power they absorb.

The device to which the invention relates has the primary qualities of offering an infinite scale of different gear ratios both for forward and for reverse operation, the change from any gear ratio to another being effected gradually, without noise, without a jerk, and without its being necessary to actuate a clutch. Furthermore, the device does not involve any abnormal friction that may absorb a substantial part of the power of the engine. Since it offers an exactly appropriate gear ratio at every instant and for each particular force required, it therefore enables, in any circumstances, the engine to be used continually at a given speed, or at any other speed, at the sole will of the driver.

The mechanism according to the invention is essentially characterized by the fact that the drive shaft imparts a reciprocating rectilinear movement to a first carriage which is compelled to move in an orientable direction and which in turn actuates a second carriage which is compelled to effect a reciprocating rectilinear movement in an invariable direction, the amplitude of said movement depending on the variable orientation of the movement of the first carriage relatively to the invariable direction of the movement of the second carriage, which movement is finally converted into a rotary movement, the speed of which will therefore be dependent, for a given speed of rotation of the engine, on said orientation.

Other features and peculiarities of the invention will become apparent from the ensuing description taken with reference to the accompanying drawings which show, diagrammatically and simply by way of example, one embodiment of the invention.

In said drawings:

Fig. 2 is a view in transverse section of this same element.

Fig. 3 is a view in sectional elevation along the line III—III of Fig. 2.

Figs. 6 and 7 are respectively sections along the lines VI—VI and VII—VII of Fig. 1.

Figs. 8 and 9 show a constructional detail.

Fig. 10 shows a semi-automatic arrangement for starting and stopping the electric actuating motor.

Fig. 11 shows, by way of example, the corresponding electric diagram.

Figure 4:
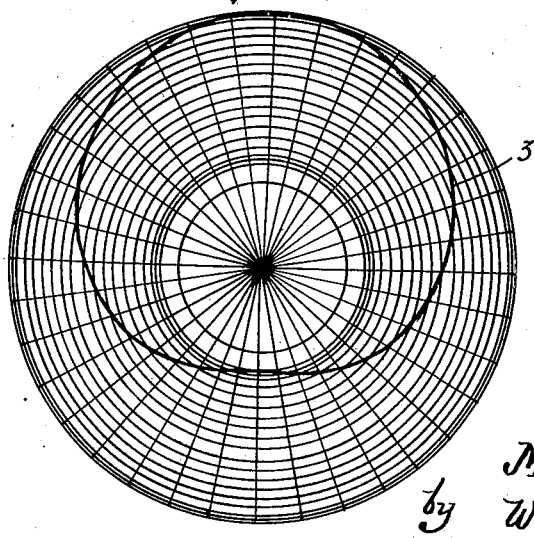
Fig. 4 shows, on a larger scale, one of the actuating cams.

A change speed gear according to the invention comprises a number of similar elements which co-operate with each other in the manner which will be explained hereinafter and are simultaneously actuated by the drive shaft, through the intermediary of a shaft 1 which is common to all said elements and which forms the driving shaft for the change speed gear. Each of said elements essentially comprise a first carriage 2 to which the shaft 1 is capable of imparting a reciprocating rectilinear movement by means of one or two cams 3. Each of said cams, shown in detail in Fig. 4, is so shaped that all its diameters are equal, thereby enabling it to act in both directions on the carriage 2, without a retracting spring. Furthermore the shape of said cam is such that the rectilinear movement of said carriage 2 is first of all accelerated at the beginning of each of the travels, then uniform, and finally retarded at the end of the travel.

Said carriage 2 is guided in its movement by roller tracks 4 carried by a frame 5, the orientation of which can be modified by rotating a pinion 6 which meshes with a rack 7 secured to said frame 5.

On the outer periphery of the carriage 2 is provided a circular housing 8 in which is mounted a two-piece slide 9 which is freely mounted in said housing and which can move with a rectilinear motion on roller tracks 10 carried by a second carriage 11 which is compelled to move in an invariable direction that is determined by the direction of the two roller tracks 12 carried by a fixed frame 13. The direction of the roller tracks 10, which determines the direction in which the slide 9 moves, is perpendicular to the direction of the roller tracks 12, which determines the direction of the movement of the second carriage 11.

This part of the mechanism operates in the following manner: it will first of all be assumed that the orientable frame 5 has been brought into the position shown in Fig. 3, in which the roller tracks 4 are parallel with the roller tracks 12. When the camshaft 1 rotates, it imparts to the carriage 2 a reciprocating rectilinear movement, the amplitude of which is determined by the shape of the cam and is consequently constant. As in this position of the orientable frame 5, the carriage 2 is compelled to move in a direction parallel with the direction of the roller tracks 12, this first carriage 2, through the intermediary of the slide 9, imparts a reciprocating rectilinear movement of the same amplitude and in the same direction to the second carriage 11. The slide 9 itself will effect solely a reciprocating rectilinear movement in this same direction.

Figure 1:
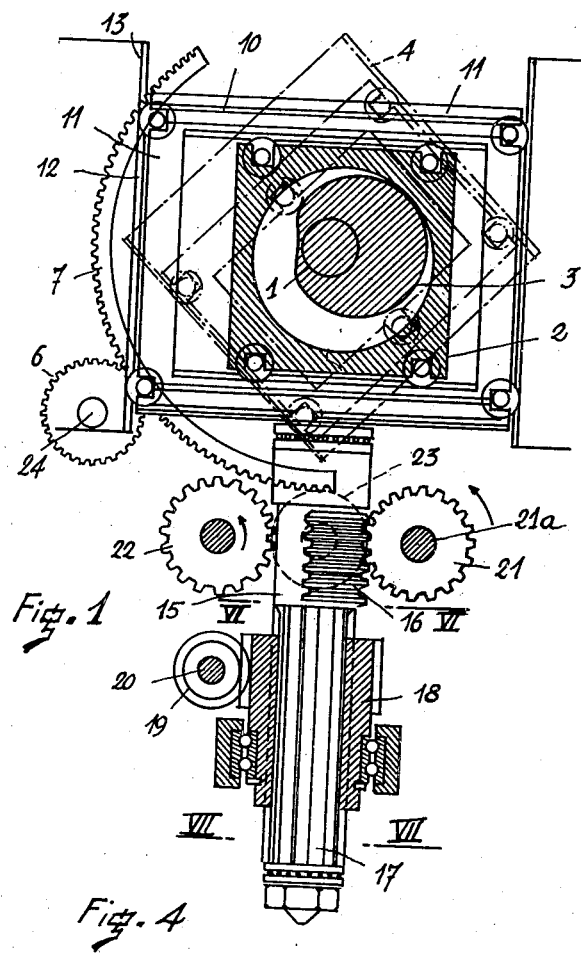
Fig. 1 is a view in sectional elevation of the general arrangement of one of the elements of the change speed gear according to the invention.

If on the contrary, the frame 5 is tilted so as to bring for example its roller tracks 4 into the inclined position shown in chain dotted lines in Fig. 1, the reciprocating rectilinear movement of the first carriage 2 must in this case, occur in this inclined direction. As, on the other hand, the second carriage 11 must always move in the same invariable direction, the movement of the intermediate slide 9 will be decomposed into a horizontal component (lost movement which occurs freely along the roller tracks 10) and a vertical component which is the useful component and which determines the amplitude of the reciprocating movement of the second carriage 11. The magnitude of said vertical component depends on the slope of the orientable frame 5. It is at a maximum when said frame 5 is oriented so that the roller tracks 4 are parallel with the roller tracks 12. It is nil when the roller tracks 4 are perpendicular to the tracks 12. In this latter position, the intermediate slide 9 effects, in fact, simply a reciprocating rectilinear movement along the tracks 10 without imparting any movement to the second carriage 11.

Thus, therefore, by simply changing the orientation of the frame 5, it is possible, for a constant speed of the shaft 1 and, consequently, of the engine shaft, to impart to the second carriage 11 a reciprocating rectilinear movement, the amplitude of which can be varied at will.

If this reciprocating rectilinear movement of the second carriage is then converted again into a rotary movement, the same will occur at a speed which will depend on the slope of the frame 5.

In the example shown, this conversion of the rectilinear movement of the carriage 11 into a rotary movement is obtained in the following manner. Said carriage 11 carries a tail 14 on which is mounted a sleeve 15 which can rotate freely on said tail but follows all the rectilinear movements thereof. Said sleeve 15 carries a rack 16 which is however limited to a segment of about 120° (see Fig. 6) for reasons which will be explained hereinafter.

At its lower part, the sleeve 15 is terminated by a splined portion 17 on which is mounted a worm wheel 18 which is fixed longitudinally and is actuated by a worm 19 carried by a shaft 20 which is actuated, for example, by the camshaft 1, in such a manner that said worm 19 imparts one complete revolution to the sleeve 15 for each revolution of the shaft 1. Under these conditions, during the downward travel of the carriage 11, the rack 16 of the sleeve 15 will mesh with a pinion 21 which it will rotate in the direction of the arrow (Fig. 1), whereas during the upward travel of said carriage, said rack 16 will mesh with a diametrically opposite pinion 22 which it will consequently rotate in the same direction. Owing to the fact that the amplitude of the reciprocating movement of the sleeve 15 depends on the slope of the orientable frame 5, the amplitude of the rotary movement effected by the pinions 21 and 22 likewise depends on said slope. If therefore the pinions 21 and 22 are connected together kinematically by means, for example, of an intermediate pinion 23, each of these three pinions will effect a rotary movement, the speed of which is a function of the orientation of the frame 5. The shaft of any one of said three pinions, the shaft 21a for example, will form the driven shaft of the mechanism.

As previously explained, the cam 3 produces a reciprocating movement which, for each travel, is first of all accelerated, then uniform and finally retarded. It is in order only to use the uniform movement that the rack 16 has been given the shape of a segment only. Under these conditions, at the beginning and at the end of each travel of the sleeve 15, corresponding to the acceleration and to the retardation of its movement, the rack 16 does not mesh with the corresponding pinion, which is thus not driven: these pinions are only actuated by said rack 16 when the sleeve 15 moves longitudinally with a uniform movement.

It should however be observed that when the orientation of the frame 5 is modified, the point of engagement of the cam 3 with the first carriage 2 varies by the same angle. It is therefore necessary in this case to vary by the same angle, the angular position of the rack 16, that is to say of the sleeve 15 about the tail 14. This result can be obtained in the manner shown on Figs. 8 and 9. In this Fig. 9 is again shown the pinion 6 which controls the rack 7 and consequently the slope of the frame 5. Said pinion 6 is fast on a shaft 24 which is driven by a worm 25, at the end of the shaft 26 of which is fixed a bevel pinion 27 that drives another bevel pinion 28 carried by a bush 29 having a thread 30 in which can screw the threaded end 31 of a second bush 32 which is able to move longitudinally but cannot rotate. In said bush 32 is mounted, in such a manner that it is longitudinally displaced by said bush, while it can rotate freely relatively to same, the end 20a of the shaft 20 on which is fixed the worm 19 that drives the pinion 18 and, consequently, the sleeve 15. It will then immediately be understood that when the shaft 26 is actuated so as to modify the orientation of the frame 5, this automatically produces a longitudinal movement of the worm 19 which then acts like a rack and imparts an additional angular movement to the pinion 18 and, consequently, produces the desired deviation of the rack 16. The normal rotary movement of the shaft 20 is imparted to same by means of a pinion 33 which can receive its rotary movement from the camshaft 1 through the intermediary of any appropriate transmission. Said pinion 33 is secured to a sleeve 34 which is provided with internal grooves in which can slide the ribs 35 of the shaft 20 so that same can be driven by said pinion 33 while it can move longitudinally relatively to same.

Figure 5:
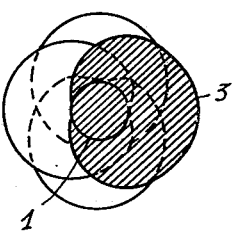
Fig. 5 is a diagrammatical view showing the angular setting of the various cams for the various elements of the same change speed gear.

According to the invention, a plurality of elements are arranged which are identical with the one just described. Said elements may be juxtaposed consecutively to each other so that the camshaft 1 is common to all said elements. The cams 2 which correspond to the various elements are suitably displaced relatively to each other, as shown in Fig. 5, so that said elements are simultaneously at different phases of their movement. Thus, for example, if it is assumed that, as shown in Fig. 5, there are four elements, each of the cams will be displaced 90° relatively to the adjacent cams. Similarly, the shaft 24 which carries the actuating pinions 6 for the various orientation frames will be common to all said elements and so will the shaft 20 which carries a worm 19 for each element. All the pinions 21 are fixed on the same shaft and so are all the pinions 22. The whole arrangement formed by said pinions 21 and 22 and the pinion or pinions 23 which connected them together, will form a gear train, from any one of the shafts of which a substantially uniform rotary movement can be obtained, the speed of which relatively to the speed of the shaft 1 will depend on the slope of the frames 5.

Thus, according to the invention, a change speed gear will be obtained by means of which the speed of rotation of the driven shaft can be varied by a simple control of the shaft 24 which carries the various driving pinions 6. A maximum speed ratio will be obtained when said frame 5 is in the position in which the roller tracks 4 are parallel with the fixed roller tracks 12, and zero speed when said roller tracks 4 are perpendicular to said roller tracks 12. Beyond this perpendicular position, a reverse rotary movement will be obtained which enables reverse operation to be obtained automatically. It will be observed, in fact, that when the roller tracks 4 pass the position in which they are parallel with the roller tracks 10, the travel of the first carriage 2, which normally corresponded to an upward travel of the second carriage 11, will in this case correspond to a downward travel of same.

The shaft 24 which carries the driving pinions 6 can be operated in any appropriate manner. It may be operated, for example, by hand or by means of any suitable motor or servo-motor. It is even possible to provide automatic or semi-automatic controls which involve the load encountered by the engine and the most efficient working speed at which it is desired to make said engine operate.

A description will be given, but only by way of example, of the semi-automatic control of the change speed gear according to the invention, shown in Figs. 8, 10 and 11. In this embodiment, the shaft 24 is driven by the shaft 26 which is itself driven by an electric motor 36 (Fig. 3) which can rotate in one direction or in the other to tilt the orientable frame 5 in the corresponding direction. The semi-automatic control of said motor 36 in one direction or in the other is obtained by means of the device shown in Fig. 10, which includes in particular a revolution-counter pointer 37, the angular position of which depends on the speed of rotation of the engine, of the automobile for example. Said pointer 37 is made of an insulating material; it is however provided with a stud 38 which is a good conductor and which is adapted to move opposite a quadrant 39 which is a good conductor but is however provided with an insulating stud 40. Said quadrant can be moved angularly by the user by means, for example, of a handle 41. The user will vary the angular position of said quadrant according to the number of revolutions at which he wishes the speed of the engine to become stabilized. If, for example, he wishes said speed to become stabilized at 3000 revolutions, he brings said quadrant into the position shown in Fig. 10, in which the insulating stud 40 is opposite the graduation 3000 of the revolution-counter. The good conducting stud 38 of the pointer 37 is connected to a source of current by a wire 42. The part 39a of the quadrant 39, which is located on one side of the insulating stud 40 is connected by a wire 43 to a first electromagnet 44 which is adapted to act on a reversing switch 45 interposed in the supply line 46 of the electric motor 36. Similarly, the part 39b which is located on the other side of the insulated stud 40 is connected by a wire 47 to a second electromagnet 48 which acts on the same reversing switch 45. When neither of the electromagnets 44 or 48 is operative, the reversing switch 45 is in its mean position in which it breaks the supply line 46.

The operation then takes place under the following conditions. When the pointer 37 is opposite the insulated stud 40, the electromagnets 44 and 48 are not energized and the motor 36 does not receive any current. The change speed gear mechanism therefore remains in the same position and transmits the speed at a constant ratio. When, on the contrary, for any reason, the speed of the engine varies, increases for example, the pointer 37 comes opposite the conducting portion 39b of the quadrant 39. The electromagnet 48 attracts the reversing switch 45 into the position shown in Fig. 11, the motor 36 is then actuated in the direction for which the speed of the driven shaft of the change speed mechanism will increase, thereby increasing the load on the engine, decreasing its speed and returning the pointer 37 opposite the insulated stud 40.

If, on the contrary, the speed of the engine decreases, it is the electromagnet 44 which becomes operative and produces the reverse effect.

A reversing switch 49 is furthermore interposed in the line 46 and is operated by the user for reversing.

A switch 50 is provided on the supply line of the motor. Similarly, a switch 51 and a switch 52 are respectively provided on the line 43 and 47. The switch 51 is automatically opened when the orientable frame 5 reaches its extreme position in which the camshaft 1 is driven with the maximum speed ratio, whereas the switch 52 is opened when said frame reaches its opposite extreme position, for forward operation (zero speed). In these two extreme positions, it is, in fact, indispensable for it only to be possible to actuate the electric motor 36 in the direction for which the frame 5 tends to move away from the extreme forward operating position it occupies. The switch 52 must however be put out of action for reversing.

In the case of the application of the device according to the invention to automobile vehicles, an optional free wheel or clutch system may advantageously be provided between the mechanism and the shaft transmitting power to the wheels, so as to enable the engine to idle or to be stopped, while the vehicle is still moving at a certain speed.

Of course, all the parts which have to effect a reciprocating movement will be constructed in such a manner as to be as light as possible, so that they may have the least possible inertia. On the other hand, the cams will be so constructed that their lack of balance is compensated for to the greatest possible extent.

It is moreover obvious that the invention has only been described and illustrated in an explanatory and nowise limitative manner and that modifications of detail may be made therein without altering its spirit.

I claim:

1. A change speed gear comprising a driving shaft, a driven shaft and a plurality of identical elements arranged between said two shafts and transmitting the movement from the driving shaft to the driven shaft with change of speed, each of said elements comprising a first carriage, means whereby the driving shaft imparts to said first carriage a reciprocating rectilinear movement of constant amplitude, an orientable frame, guide tracks on said frame for guiding the movement of the first carriage in a variable direction, a second carriage having a reciprocating rectilinear movement, a fixed frame, guiding means on said fixed frame for guiding the movement of said second carriage in an invariable direction, means whereby the first carriage, when it moves in the direction determined by the orientation of the first frame, imparts to the second carriage a reciprocating movement in said invariable direction and with a variable amplitude dependent on said orietation of the first frame, means for modifying said orientation, and means for converting the reciprocating rectilinear movement of variable travel of the second carriage, into a rotary movement of variable speed which is imparted to the driven shaft.

2. Change speed gear according to claim 1, wherein the means whereby the driving shaft imparts a reciprocating rectilinear movement to the first carriage, comprise cams carried by said driving shaft and acting on said carriage, each of said cams having diameters which are all equal and having a first portion which imparts an accelerated movement to the carriage, a second portion which imparts a uniform movement to same, and a third portion which imparts thereto a retarded movement.

3. Change speed gear according to claim 1, wherein the means whereby the first carriage actuates the second carriage comprise a slide which is freely mounted on the first carriage and is guided in guide tracks carried by the second carriage, the direction of said guide tracks being perpendicular to the direction of the fixed guide tracks which guide the movement of said second carriage.

4. Change speed gear according to claim 1, wherein the means of converting the reciprocating rectilinear movement of the second carriage into a rotary movement, comprise a rack carried by said second carriage and which, in each of its travels in the same direction, imparts a rotary movement to at least one pinion kinematically connected to the driven shaft, whereas in its travels in the opposite direction, said rack does not drive said pinion, means being provided for causing said rack to mesh with said pinion only when the second carriage, and consequently said rack, move with a uniform movement.

5. Change speed gear according to claim 1, wherein the means for converting the reciprocating rectilinear movement of the second carriage into a rotary movement, comprise a rod carried by said second carriage, a sleeve adapted to rotate freely on said rod, a rack carried by said sleeve and extending only over an arc of a circle, at least one pinion adapted to be actuated by said rack, means for imparting a rotary movement to said sleeve, in synchronism with the rotation of the driving shaft, so that said rack only meshes with said pinion during the travel of said second carriage in one direction, the amplitude of the arc over which the rack extends being such that said rack only meshes with the associated pinion when said second carriage moves with a uniform movement, and means for displacing the angular position of said sleeve relatively to the angular position of the driving shaft, in synchronism with the angular displacement of the orientable frame modifying the relative direction of the movements of the two carriages.

6. Change speed gear according to claim 1, comprising a driving shaft, a driven shaft and a plurality of identical elements arranged between said two shafts and transmitting the movement from the driving shaft to the driven shaft with change of speed, wherein the actuating cams for the various elements are angularly displaced relatively to each other so that said various elements are simultaneously at different phases of their movement.

MARIE EMILE LOUIS JULES HUSSON.